United States Patent [19]
Ellis

[11] Patent Number: 5,657,801
[45] Date of Patent: Aug. 19, 1997

[54] FILLING HEAD

[75] Inventor: Peter Ellis, Fordingbridge, United Kingdom

[73] Assignee: Bagfilla Overseas Limited, Leicester, England

[21] Appl. No.: 545,223

[22] Filed: Oct. 19, 1995

[30] Foreign Application Priority Data

Oct. 24, 1994 [GB] United Kingdom .................. 9421365

[51] Int. Cl.$^6$ ...................................................... B65B 1/04
[52] U.S. Cl. .......................... 141/250; 141/255; 141/264; 141/269; 141/290; 141/314
[58] Field of Search ............................ 141/250, 251, 141/254–258, 260, 263, 264, 269, 290, 291, 313–317, 114, 10, 362; 222/556; 53/570, 573, 260, 284.7; 251/340, 341

[56] References Cited

U.S. PATENT DOCUMENTS 3,472,291  10/1969  Roeschen .................... 141/315
3,830,266   8/1974  Hudson ....................... 141/10
4,537,013   8/1985  Tetenborg et al. ............ 141/317
5,322,096   6/1994  Tetenborg et al. ............ 141/10

FOREIGN PATENT DOCUMENTS

0490607A1  6/1992  European Pat. Off. .

Primary Examiner—Henry J. Recla
Assistant Examiner—Steven O. Douglas
Attorney, Agent, or Firm—Wallenstein & Wagner, Ltd.

[57] ABSTRACT

A filling head comprising inner and outer concentric cylindrical ducts, hingedly connected doors movable between an open depending position and a horizontal position closing the lower ends of the ducts in response to movement of the outer duct between a raised position and a lowered position respectively.

10 Claims, 2 Drawing Sheets

FILLING HEAD

TECHNICAL FIELD

This invention concerns a filling head, particularly, though by no means exclusively, suitable for filling intermediate bulk carriers of the kind commonly known as "big bags" with fluent solid materials.

BACKGROUND OF THE INVENTION

A known kind of filling head comprises concentric cylindrical ducts, the inner of which provides a communication between a valve at the bottom of a supply hopper and the bag to be filled and the outer of which enables air-borne dust created within the bag during filling to be extracted.

After filling a bag some material is likely to remain within the ducts which can be dislodged into the environment when the bag is removed from the filling head. A solution to this hazard is provided by EP 0 490 607 which discloses doors which can be manually closed over the open lower ends of the ducts before removing a bag from the filling head. A problem with this arrangement, however, is the possibility of an operator failing to operate the doors correctly.

SUMMARY OF THE INVENTION

It is an object of the present invention to provide a filling head which overcomes the problem aforesaid.

According to the present invention there is provided a filling head comprising inner and outer concentric cylindrical ducts, hingedly connected doors movable between an open depending position and a horizontal position closing the lower ends of the ducts in response to movement of the outer duct between a raised position and a lowered position respectively.

The doors may be semi-circular and hingedly connected along a diameter of the outer duct.

The filling head may be for use in filling bags.

A clamping ring may surround the ducts to clamp the neck of the bag against the lower end of the outer duct when the ducts are raised to a bag filling position with the doors open.

The doors may be hingedly connected to the lower ends of levers at positions radially outward from their hinged connections, the upper ends of the levers being pivotally connected at fixed positions.

The upper ends of the levers may be pivotally connected to the inner duct.

The invention will be further apparent from the following description, with reference to the figures of the accompanying drawing, which show, by way of example only, one form of filling head embodying same.

DETAILED DESCRIPTION OF THE PREFERRED EMBODIMENT

Figure 1:
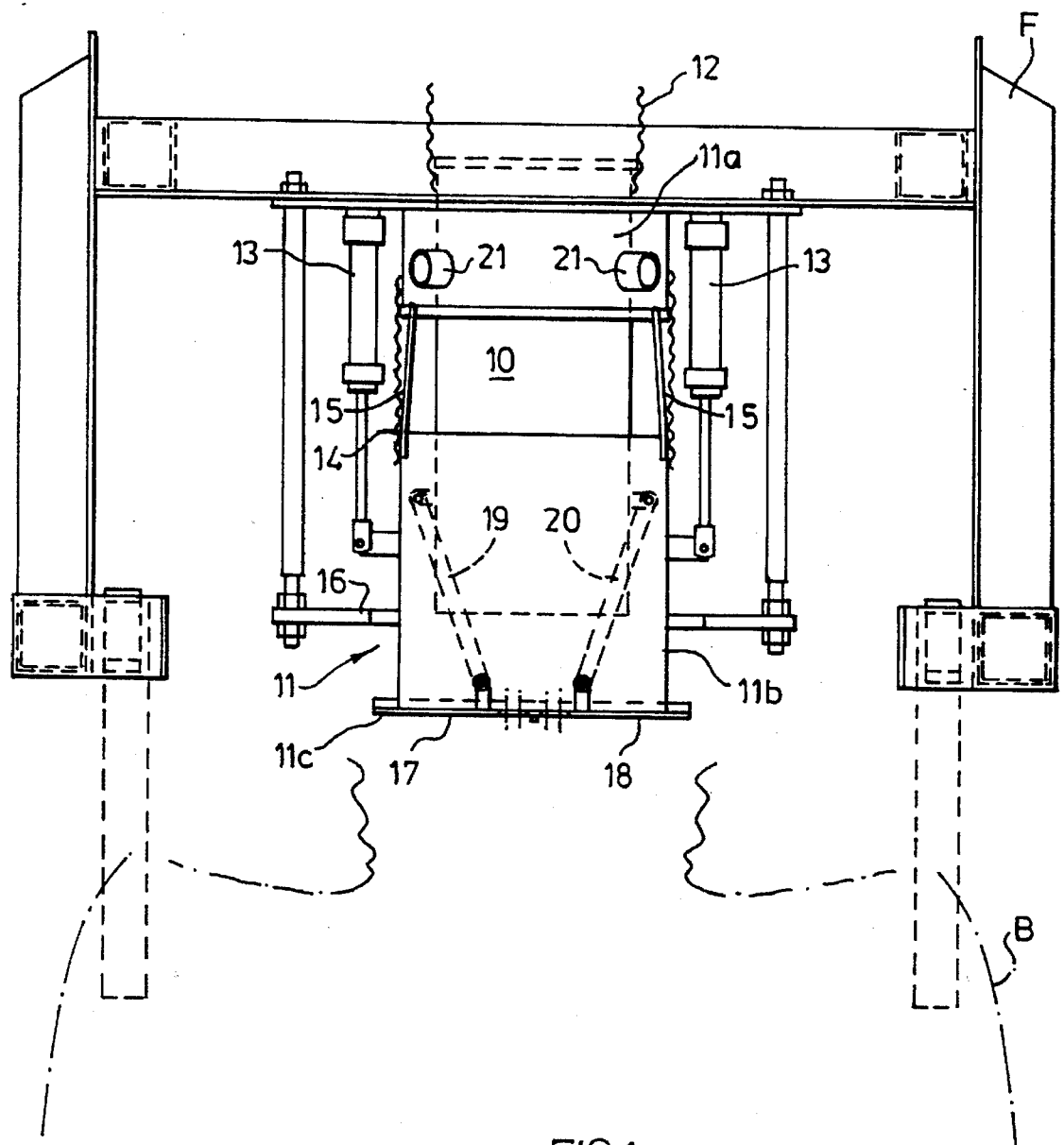
FIG. 1 shows the filling head with its outer duct in a lowered position.

Referring now to the drawing, it will be seen that the filling head comprises an inner fixed cylindrical duct 10 and a concentric outer cylindrical duct 11. The upper end of the inner duct 10 is connected to a storage hopper (not shown) by a cylindrical bellows arrangement 12.

Figure 2:
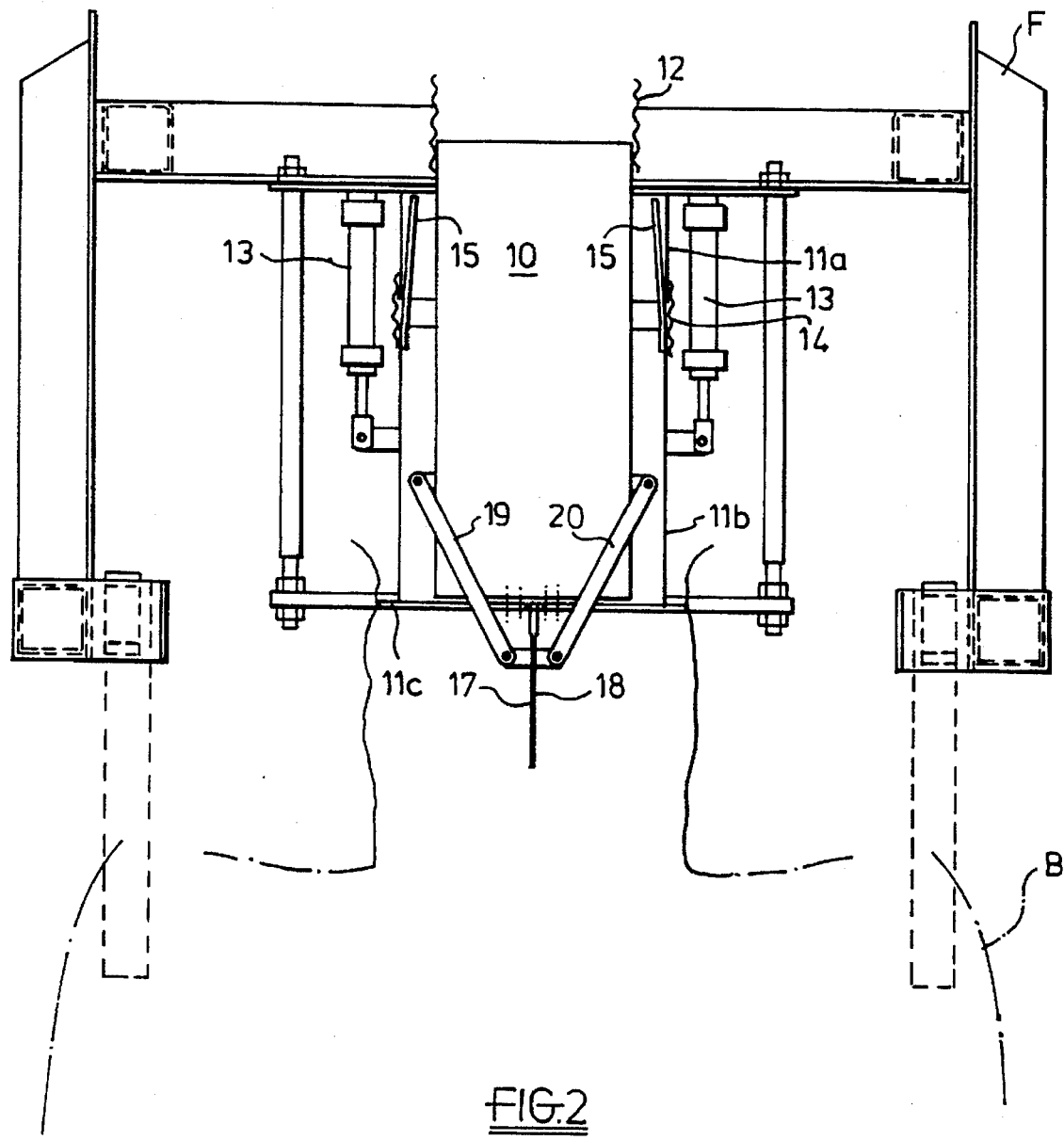
FIG. 2 shows the filling head with its outer duct in a raised position.

The outer duct comprises an upper fixed part 11a and a lower part 11b which is movable between lowered (FIG. 1) and raised (FIG. 2) positions by means of double-acting pneumatic cylinders 13. The parts 11a and 11b are connected by an extendible and contractable cylindrical bellows arrangement 14. Fingers 15 extend upwardly from the lower part 11b to prevent the bellows arrangement 14 from occluding the annular space between the parts 11a and 11b when the part 11b is in its raised position.

When the part 11b is in its lowered position, the neck of a bag B to be filled may be positioned over the lower end of the outer duct such that when the part 11b is moved to its raised position the neck of the bag is clamped between a flange 11c on the lower end of the part 11b and a fixed clamping ring 16. The edge of the ring 16 and the flange 11c are machined with mating tapers A pair of semi-circular doors 17 and 18 are provided and hingedly connected to the bottom end of the lower duct part 11b along a diameter thereof.

The doors are movable between a horizontal position closing the open lower ends of the duct 11 when the part 11b is in its lowered position and a depending position leaving the lower end of the duct 11 open when the part 11b is in its raised position.

The doors move automatically between their two positions in response to raising and lowering of the duct part 11b. This is ensured by levers 19 and 20 pivotally connected at their upper ends to the fixed duct 10 and hingedly connected at their lower ends to the doors 17 and 18 respectively at positions radially outward of their hinged connections. The levers 19 and 20 are located through slots in the inner duct 10 to permit their required movement.

When the doors are in their depending position their outer faces are held firmly together through the action of the cylinders 13 and levers 19 and 20 to prevent contamination of those surfaces. When the doors are moved to close the duct all exposed surfaces are essentially clean the only exception being a narrow ring around the upper surface of doors where they extend outwardly of the duct.

In use with the duct part 11b lowered and doors closed, a bag is positioned over lower end of the outer duct part 11b which is then raised to clamp the bag and open the doors to enable the bag to be filled by supply of material through the inner duct 10. After filling the duct part 11b is lowered to release the bag and close the doors to prevent discharge of any material retained within the ducts.

Ports 21 in the fixed outer duct part 11a allow air to escape which is displaced from the bag as filling proceeds. Air may also be introduced through the ports 21 to inflate any liner within the bag before filling commences.

The entire assembly is carded on a weighframe F which also supports the bag B which is rigged to the frame F before filling commences. Any movement between the weighframe F and supply hopper is accommodated by the bellows arrangement 12.

It will be appreciated that it is not intended to limit the invention to the above example only, many variations being possible, such as might readily occur to one skilled in the art, without departing from the scope thereof as defined by the appended claims.

Thus the filling head may be enclosed in a cabinet, the ring 16 forming a hole in its base. This is particularly useful where hazardous or toxic materials are to be handled.

I claim:

1. A filling head comprising inner and outer concentric cylindrical ducts, and a plurality of doors hingedly connected to a bottom end of the outer duct, the doors being movable between an open depending position and a horizontal position closing the lower ends of the ducts, wherein the movement of the doors from the horizontal position to the open position is responsive to movement of the outer duct between a raised position and a lowered position respectively.

2. A filling head according to claim 1 wherein the doors are semi-circular.

3. A filling head according to claim 1 wherein the filling head is for use in filling bags.

4. A filling head according to claim 1, further comprising a plurality of levers having lower ends and upper ends wherein the lower ends of the levers are hingedly connected to the doors at positions radially outward from the hinged connections of the doors to the bottom end of the outer duct.

5. A filling head according to claim 4, wherein the upper ends of the levers are pivotally connected to the inner duct.

6. A filling head according to claim 5 wherein the filling head is for use in filling bags.

7. A filling head according to claim 5, further comprising a clamping ring engaging the outer duct to clamp the neck of the bag against the lower end of the outer duct when the ducts are raised to a bag filling position with the doors open.

8. A filling head according to claim 1 wherein an outer face of one door abuts an outer face of a second door in the open depending position.

9. A filling head for use in filling bags, comprising:

inner and outer concentric cylindrical ducts;

a plurality of doors hingedly connected to a bottom end of the outer duct, the doors being movable between an open depending position and a horizontal position closing the lower ends of the ducts, wherein the movement of the doors from the horizontal position to the open position is responsive to movement of the outer duct between a raised position and a lowered position respectively; and a clamping ring engaging the outer duct to clamp the neck of the bag against the lower end of the outer duct when the ducts are raised to a bag filling position with the doors open.

10. A filling head comprising:

inner and outer concentric cylindrical ducts;

a plurality of doors hingedly connected to a bottom end of the outer duct, the doors being movable between an open depending position and a horizontal position closing the lower ends of the ducts, wherein the movement of the doors from the horizontal position to the open position is responsive to movement of the outer duct between a raised position and a lowered position respectively; and a plurality of levers having lower ends and upper ends wherein the lower ends of the levers are hingedly connected to the doors at positions radially outward from the hinged connections of the doors to the bottom end of the outer duct, and wherein the upper ends of the levers are pivotally connected to the inner duct.

\* \* \* \* \*